United States Patent [19]
Spencer et al.

[11] Patent Number: 5,791,032
[45] Date of Patent: Aug. 11, 1998

[54] ROBOTIC TURRET TOOL

[75] Inventors: Timothy F. Spencer; Gerald N. Walter, both of Rochester, N.Y.

[73] Assignee: Eastman Kodak Company, Rochester, N.Y.

[21] Appl. No.: 856,834

[22] Filed: May 15, 1997

[51] Int. Cl.$^6$ .................................................. B23B 16/08
[52] U.S. Cl. ........................... 29/48.5 A; 29/39; 408/35; 483/901; 901/41
[58] Field of Search ..................... 29/39, 40, 41, 29/42, 48.5 R, 48.5 A, 33 J; 901/41, 30, 26; 408/35; 483/901, 56, 24; 74/813 L, 813 C

[56] References Cited

U.S. PATENT DOCUMENTS

| | | | |
|---|---|---|---|
| 4,520,550 | 6/1985 | Dunn et al. | 483/34 |
| 4,551,903 | 11/1985 | Bisiach | 483/16 |
| 4,587,703 | 5/1986 | Azizi et al. | 29/431 |
| 4,615,101 | 10/1986 | Edwards et al. | 483/7 |
| 4,691,419 | 9/1987 | Keeler et al. | 29/39 |
| 4,741,078 | 5/1988 | Kimura | 29/39 |
| 4,790,053 | 12/1988 | Godbecker | 29/42 |
| 4,949,443 | 8/1990 | Saruwatari et al. | 29/27 |
| 5,074,741 | 12/1991 | Johansson | 414/736 |
| 5,105,528 | 4/1992 | Soth | 483/56 |

FOREIGN PATENT DOCUMENTS

| | | | |
|---|---|---|---|
| 292146 | 12/1990 | Japan | 483/901 |

*Primary Examiner*—William R. Briggs
*Attorney, Agent, or Firm*—Mark G. Bocchetti

[57] ABSTRACT

A robotic turret tool for use with an industrial robot is mountable onto the spindle of the robot and capable of having multiple tools mounted thereto. The turret tool includes a mounting bracket adapted to be affixed to the spindle of the industrial robot, the mounting bracket including a locking element support. A turret shaft affixed to said mounting bracket. A turret head is rotatably supported on the turret shaft with multiple tools attached to the turret head allowing the robot to select which tool to use through rotation of the turret head. A locking element is slidably mounted in the locking element support. The locking element including an upper electrical supply connector and an upper pneumatic supply conduit path. The locking element is movable from a locked position engaging said turret head to an unlocked position away from said turret head. There are at least two lower electrical supply connectors mounted to said turret head with each of the lower electrical supply connectors being dedicated to one of tools. There are also at least two lower pneumatic supply conduit paths with each of the lower pneumatic supply conduit paths being dedicated to one of tools. The upper pneumatic supply conduit path aligns with a selected one of the at least two lower pneumatic supply conduit paths when the locking element is moved to the locked position and the upper electrical supply connector aligns with a selected one of the at least two lower electrical supply connectors when said locking element is moved to said locked position. In such manner, electrical and pneumatic services are supplied only to the selected tool.

18 Claims, 7 Drawing Sheets

ROBOTIC TURRET TOOL

FIELD OF THE INVENTION

The present invention relates generally to industrial robots and, more particularly, to multiple tool holding turrets for use with such industrial robots allowing the robots to perform difference functions using different tools.

BACKGROUND OF THE INVENTION

A variety of tool interfaces for use with industrial robots are known in the prior art. There are basically two different types of tool interfacing devices. The first is where the interface is moved from location to location to acquire or to replace a specific tool. The second is where a plurality of tools are mounted on a rotatable interface allowing the robot to rotate the desired tool into an operating position.

One example of a rotatable tool interface is taught in U.S. Pat. No. 4,741,078 to Kimura. Kimura teaches the use of a servo motor to select one tool for use among a plurality of tools mounted on a turret with the base of the turret fixed to one end of a vertical spindle. The turret includes a turret shaft which lies at a 45° angle from the vertical spindle. A plurality of tools are mounted on the turret head such that one active tool will be coaxial with the spindle and a bevel gear mounted at the end of the turret shaft opposite the turret head engages a bevel gear mounted on the robot frame. The spindle can be raised and lowered such that at its upper most position the two beveled gears engage and the mechanism that normally prevents rotation of the turret shaft is released so that as the spindle turns the turret mounted bevel gear revolves and drives the turret shaft and the turret head for rotation. By turning the spindle through a specific angle, a specific tool can be moved into alignment with the spindle.

Other rotatable tool interfaces for use on the end of a robotic arm are taught in U.S. Pat. No. 4,790,053 to Godbecker and U.S. Pat. No. 4,691,419 to Keeler et al.

U.S. Pat. No. 4,520,550 to Dunn et al teaches a robot tool changer wherein a support plate is used to store two or more tools, each of which includes a coupling member. A chuck is provided which has a mandrel extending therefrom which telescopically mates with the coupling members. In such manner, the chuck can be moved to a position to selectively engage with the desired tool.

U.S. Pat. No. 4,615,101 to Edwards et al teaches a tool interface having a rotatable tool changer for holding a tool on the end of a robotic arm. The tool changer is a socket chuck having spring jaws in a socket for clamping individual tools.

U.S. Pat. No. 4,949,443 to Saruwatari et al teaches a numerically controlled lathe which includes a multiple-tool head having a plurality of tools mounted thereon and a turret head which has a plurality of radially disposed tools mounted thereon.

Tool exchange on small assembly robots has generally been limited to physically dropping off end of arm tooling and then acquiring a second tool. Not only did these operations require valuable space in small assembly work envelopes, but the necessity to move to one specific location to release one tool and then move to a subsequent specific location to acquire another tool greatly extended the time needed for the robot to perform multiple operations.

Turret mechanisms have been used to maximize the cycle efficiency of robotic devices by allowing several diverse tools to be accessible on a single robotic arm. Development of such turret devices has generally not kept pace with the robotic manipulators used to support them and, consequently, use of robotic turrets has generally been limited to larger robots with payloads of over twenty pounds. In cases where turrets are applied to light weight assembly robots, functionality is often compromised in order to achieve lighter weight. The turret devices may utilize rotary drives incapable of speed and position control by relying, instead, on discreet sensors. In other instances, the robot may be required to move about or along one or more axes to engage with external drive mechanisms which further inhibits cycle time.

SUMMARY OF THE INVENTION

It is, therefore, an object of the present invention to provide an efficient method of utilizing multiple end-of-arm tools on a single robotic manipulator.

It is a further object of the present invention to provide a rotary turret tool interface for a robotic arm which offers reliable position feedback and speed control.

Still another object of the present invention is to provide a rotary turret tool holding device for use with a robotic arm which includes a motor for selecting the individual tools mounted on the rotary turret device.

Yet another object of the present invention is to provide a rotary turret holding device which includes a locking mechanism to ensure accurate positioning of the tool mounted on the turret.

It is still a further object of the present invention to incorporate pneumatic and electrical supply to the turret into the locking mechanism thereby further minimizing overall turret dimension and weight.

Briefly stated, these and numerous other features, objects and advantages of the present invention will become readily apparent upon a reading of the detailed description, claims and drawings set forth herein. These features, objects and advantages are accomplished by providing a turret mechanism mountable to the spindle of a robotic arm wherein the turret head is rotatable independent of operation of the robot. The turret mechanism includes a shaft, a stepper motor, a linear actuator and a turret head to which tools are mounted. A pinion gear attached to the output shaft of the stepper motor engages a ring gear within the turret head to drive rotational movement of the turret head to locate one of the plurality of tools extending from the turret mechanism to an operable position. Once the stepper motor positions the appropriate tool, the linear actuator drives a locking system into place which prevents further rotation of the turret by the stepper motor. The locking system is integrated with the necessary electrical and pneumatic lines necessary to operate and control the selected tool. Thus, by locking the turret mechanism, the tool immediately becomes actuatable. Because the locking system includes wedge-shaped chocks which is fit into correspondingly tapered slots, the action of locking the turret mechanism in place automatically removes any potential misalignment introduced by the stepper motor and ensures that the electrical and pneumatic service lines are precisely aligned for contact to thereby operate the desired tool.

DETAILED DESCRIPTION OF THE INVENTION

Figure 1:
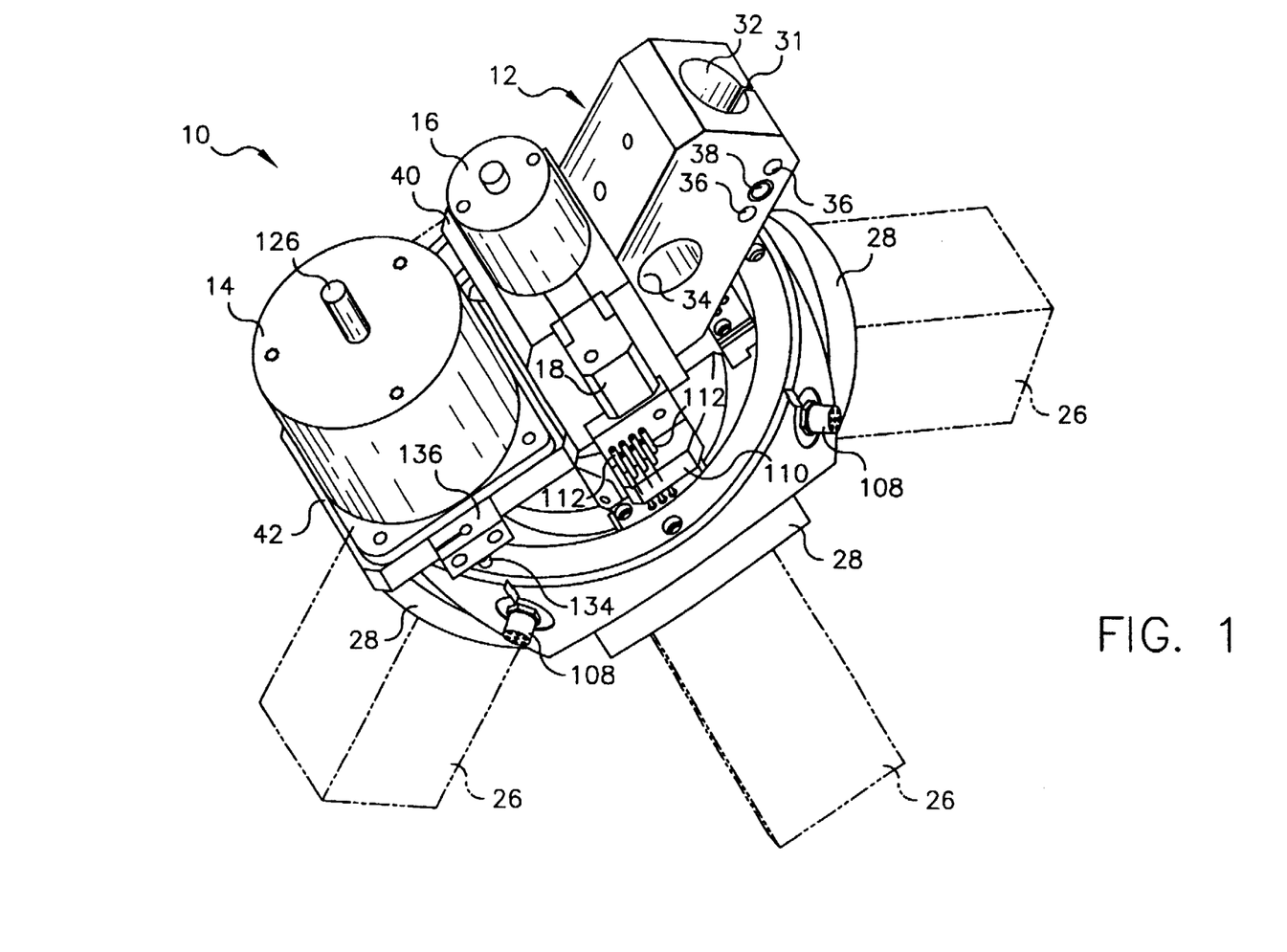
FIG. 1 is a perspective view of the robotic turret tool of the present invention.

Turning first to FIG. 1, there is shown a perspective view of the turret mechanism 10 of the present invention. The major components of the turret mechanism 10 include a mounting bracket 12, a stepper motor 14, a linear actuator 16, a locking element 18 driven by the linear actuator 16, a turret shaft 20 (see FIGS. 7 and 13) and a turret head 22. Turret head 22 includes a plurality of tool mounting recesses 24 at which individual tools 26 may be connected either directly to the turret head 22 or, instead, connected to tool adapter plates 28 which are in turn bolted to turret head 22.

Figure 2:
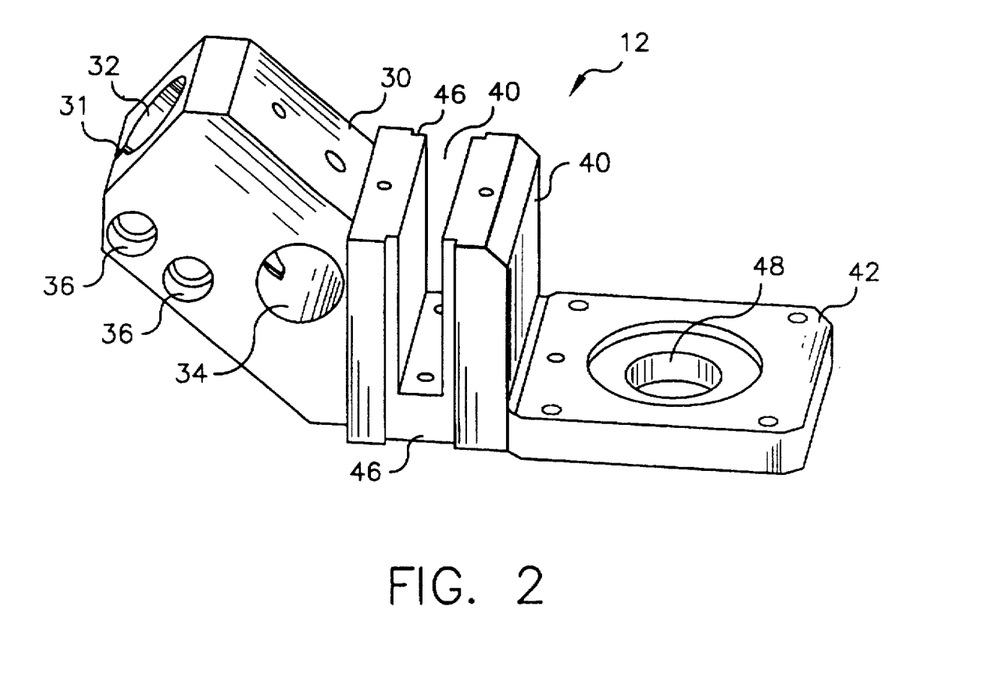
FIG. 2 is a perspective view of the mounting bracket.
Figure 3:
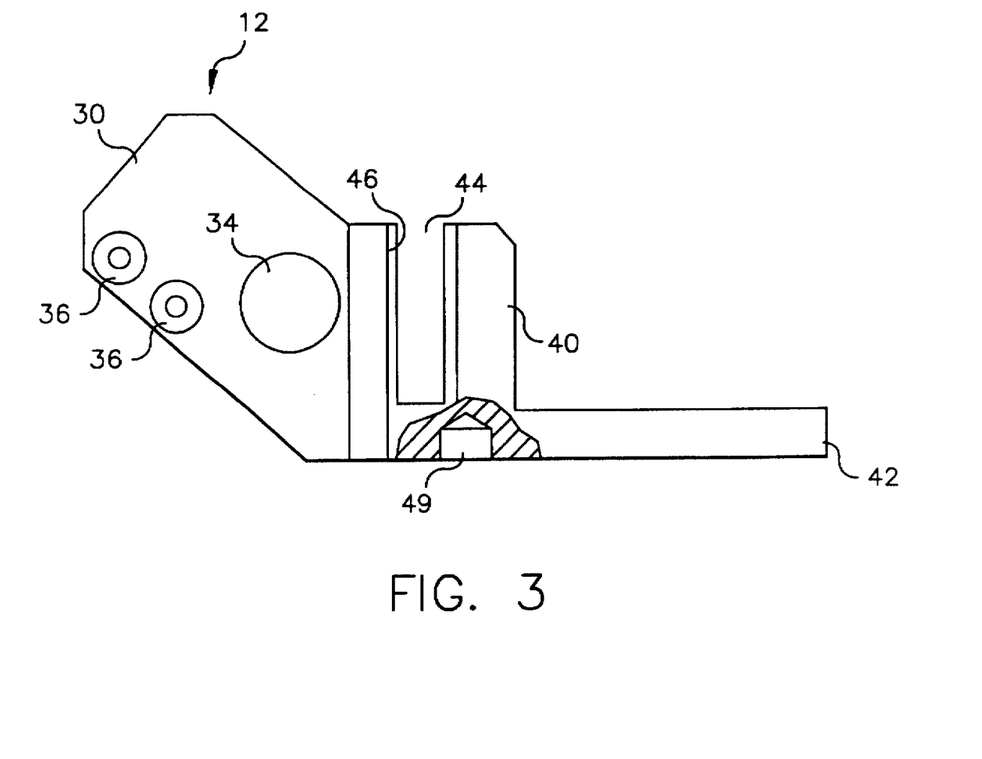
FIG. 3 is a side elevational view of the mounting bracket with a partial section thereof.

Turning next to FIGS. 2 and 3, there is shown in detail the mounting bracket 12. Mounting bracket 12 includes a pinch block 30 having a longitudinal bore 32 therein which terminates at transverse bore 34. Transverse bore 34 is through the full width of pinch block 30. Pinch block 30 is provided with a slot along one side thereof which intersects longitudinal bore 32. Longitudinal bore 32 having a longitudinal axis 33 is adapted to interface with the spindle of a robotic arm. Pinch block 30 is clamped to the spindle of the robotic arm by means of countersunk machine screws (not shown) in combination with bores 36. Bores 36 penetrate the full width of pinch block 30 crossing through slot 31. The diameter of bores 36 on the countersunk side of slot 31 is full clearance. On the opposite side of slot 31, bores 36 are threaded. In such manner, tightening of the machine screws results in a clamping action of pinch block 30 through the narrowing of slot 31. A middle bore 38 between bores 36 is provided which is countersunk from the opposite side of pinch block 30. Middle bore 38 does not penetrate through the full width of pinch block 30 and instead terminates at slot 31. Middle bore 38 is threaded such that through engaging a machine screw therewith, slot 31 can be spread to disengage pinch block 30 from the spindle of a robotic arm.

Mounting bracket 12 also includes a locking element support 40, the base of which is angled 40° from pinch block 30. Extending from locking element support member 40 is stepper motor support 42. Preferably, pinch block 30, locking element support 40 and stepper motor support 42 are machined from a single piece of aluminum such that mounting bracket 12 is one integral unit. Locking element support 40 includes a center channel 44 and side channels 46. Stepper motor support 42 includes an orifice 48 therethrough. A receptacle 49 is machined into the bottom of locking element support 40. Mounting bracket 12 is preferably machined from a single piece of aluminum.

Figure 4:
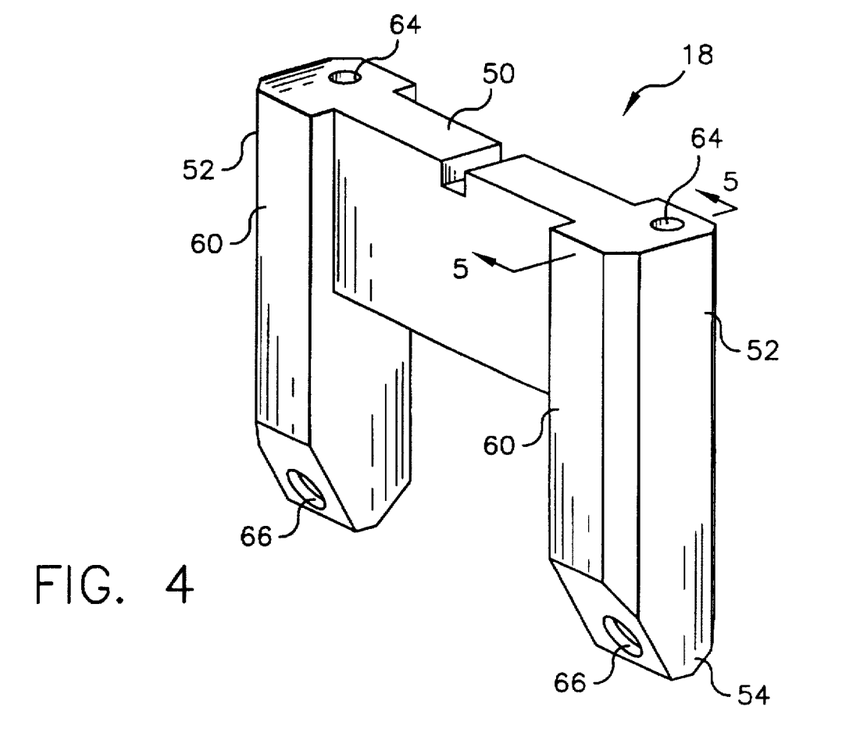
FIG. 4 is a perspective view of the locking element.
Figure 5:
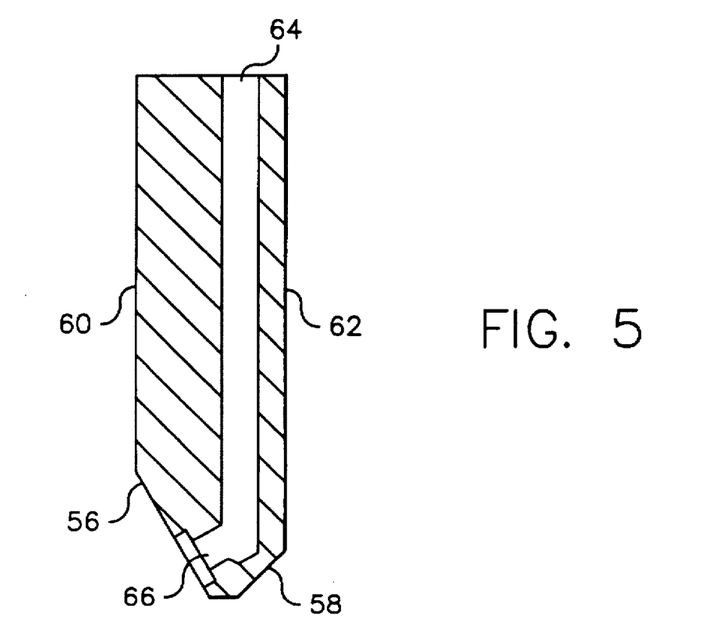
FIG. 5 is a cross-sectional view of the locking element taken along lin 5—5 of FIG. 4.
Figure 6:
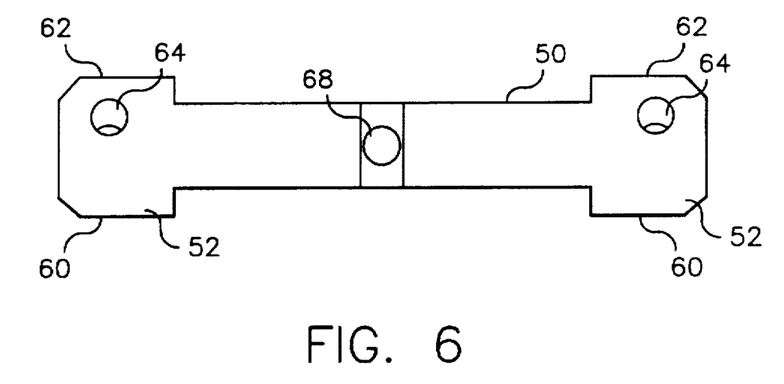
FIG. 6 is a top plan view of the locking element.

Looking next at FIGS. 4 through 5, there is shown in greater detail the locking element 18. Locking element 18 includes slide gate 50 which bridges between end rails 52 proximate to the proximal ends of end rails 52. The distal ends of end rails 52 form chocks 54. Chocks 54 include a major chamfered surface 56 and a minor chamfered surface 58. Major chamfered surface 56 is angled 30° from the adjacent vertical surface 60 of end rail 52. Minor chamfered surface 58 is angled 45° from its adjacent vertical surface 62 of end rails 52. There is a bore 64 running the length of each end rail 52 substantially parallel to vertical surfaces 60, 62. Bore 64 meets bore 66 drilled perpendicularly into major chamfered surfaces 56. Bores 64, 66 serve as an upper pneumatic conduit path as will be described hereinafter. There is a bore 68 through slide gate 50. Bore 68 allows for connection of locking element 18 to linear actuator 16 which is actually a pneumatic cylinder and piston. Slide gate 50 resides in center channel 44 and end rails 52 reside in respective side channels 46 such that through operation actuator 16, locking element 18 can be reciprocated with slide gate 50 and end rails 52 moving in center channel 44 and side channels 46, respectively. Locking element 18 is preferably made from a thermoplastic material such as Delrin®.

Figure 7:
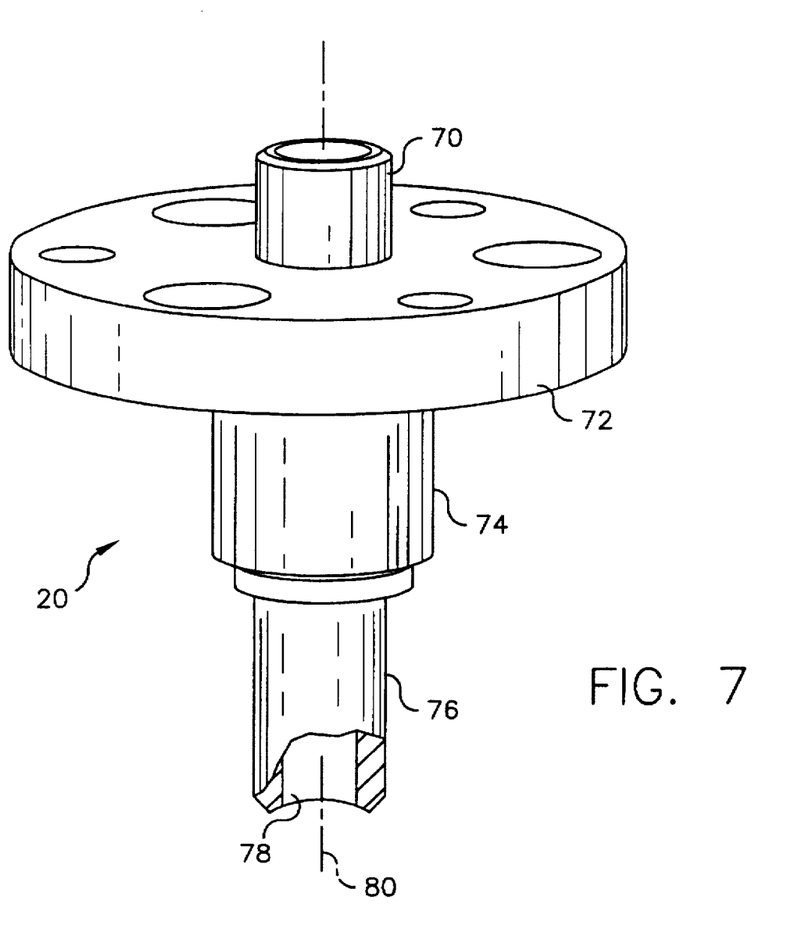
FIG. 7 is a perspective view of the turret shaft with a partial section.

Turning next to FIG. 7 there is shown in detail the turret shaft 20. Turret shaft 20 which is preferably made of stainless steel includes an upper portion 70, a radially extending flange 72, a mid-portion 74 and a shank 76. There is a threaded bore 78 in shank 76 which has a cylindrical axis which is collinear with cylindrical axis 80 of turret shaft 20. Turret shaft 20 is attached to mounting bracket 12 by means of screws such that upper portion 70 resides in receptacle 49 (See FIGS. 3 and 13.) of locking element support 40. A spacer or grind shim 77 may be inserted between flange 72 and mounting bracket 12. (See FIG. 13.) The purpose of shim 77 is to adjust the axial position of the turret head 22 in order to ensure that the tool in the active position is collinear with the spindle of the robot. The cylindrical axis 80 of turret shaft 20 resides at an angle of about 40° from the longitudinal axis 33 of longitudinal bore 32.

Figure 8:
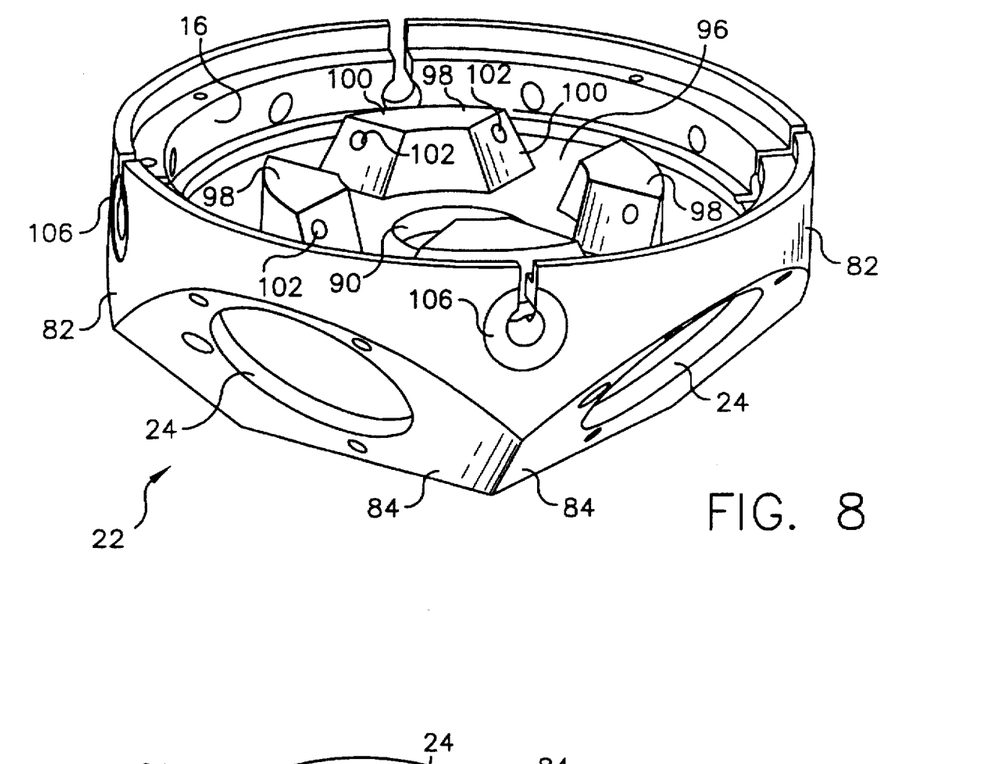
FIG. 8 is a perspective view of the turret head.
Figure 9:
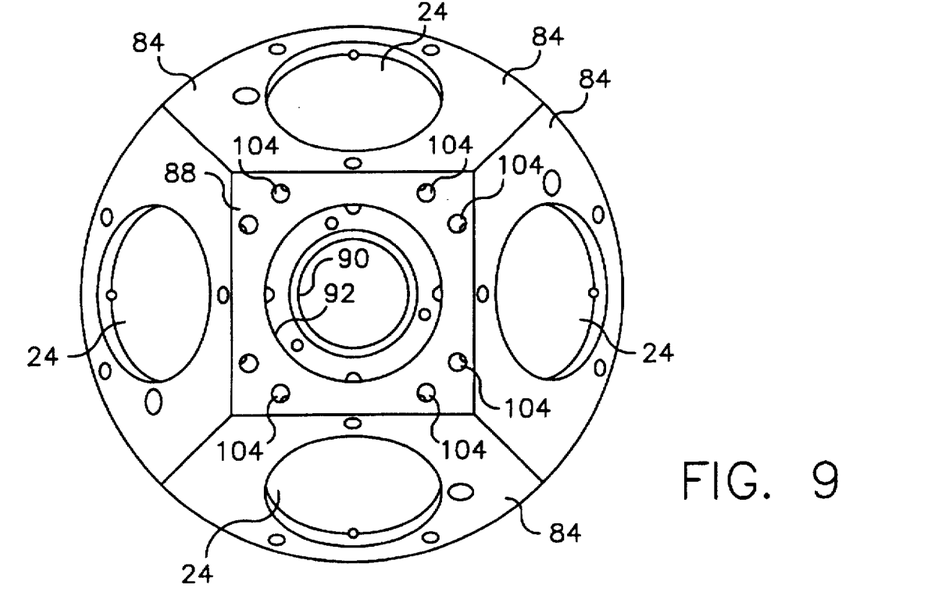
FIG. 9 is a bottom plan view of the turret head.

Looking next at FIGS. 8 and 9, there is shown in detail the turret head 22. Turret head 22 is preferably machined from a single piece of aluminum. Turret head 22, as depicted, includes an upper rim portion 82 which is generally cylindrical in shape. Located below upper rim portion 82 are four tool mounting surfaces 84, each having a tool mounting recess 24 therein. Each tool mounting surface 84 is angled 40° from the cylindrical surface of upper rim portion 82. There is a bottom wall 88 having a shank port 90 therethrough and a bearing recess 92 therein. Located within upper rim portion 82 is a chamber 94 with the base of chamber 94 defined by a substantially planar surface 96. Projecting upward from planar surface 96 are four wedge blocks 98. Each wedge block 98 includes a pair of inclined surfaces 100. There is a bore 102 in each inclined surface 100. Each inclined surface 100 is angled 60° from planar surface 96. There are eight tapped holes 104 in bottom wall 88. Each tapped hole 104 intersects with one of bores 102 to form eight lower pneumatic conduit paths. The eight lower pneumatic conduit paths allow for two pneumatic connections for each tool.

Turret head 22 includes four cable plug recesses 106 (one for each of the tools to be mounted to the turret mechanism 10) in upper rim portion 82. Cable plugs 108 reside within cable plug recesses 106 through which power and control can be supplied to the individual tools mounted to turret mechanism 10.

Figure 10:
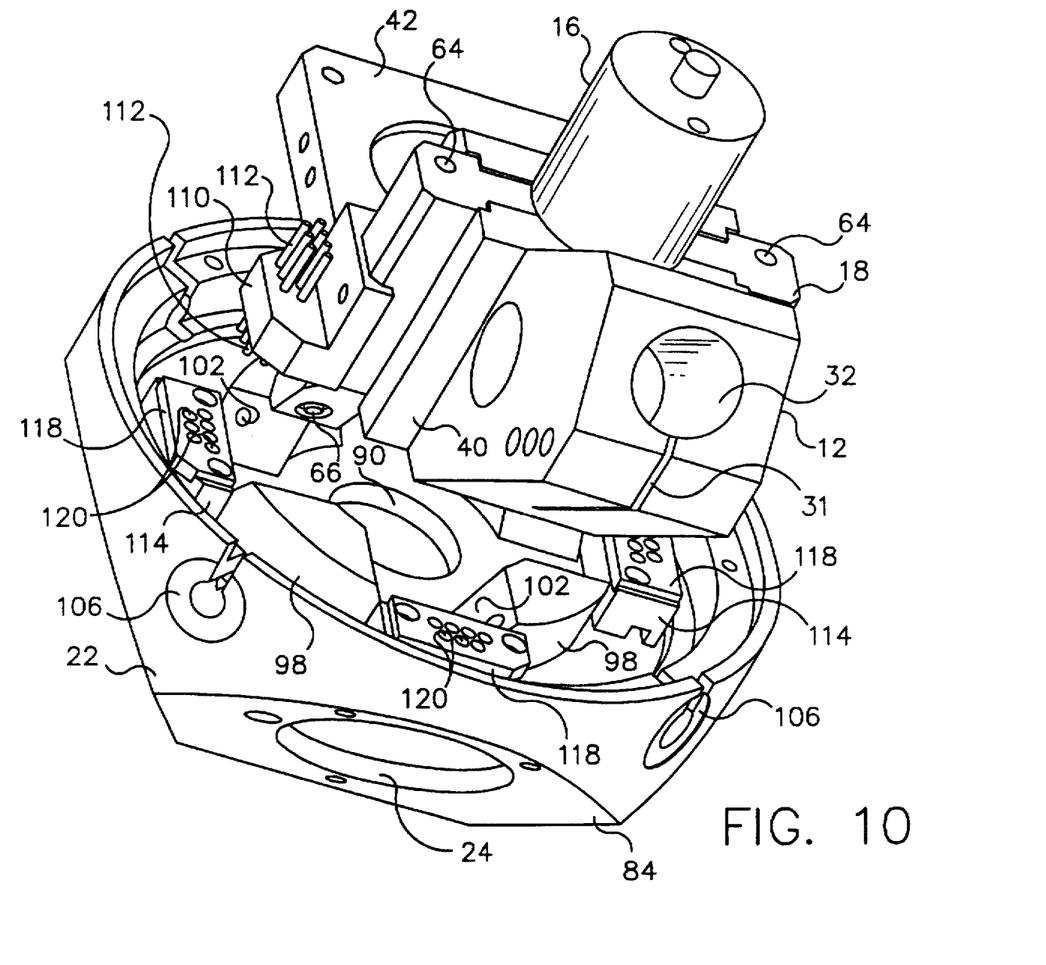
FIG. 10 is a perspective view of the robotic turret tool with the turret shaft and the stepper motor removed therefrom.
Figure 11:
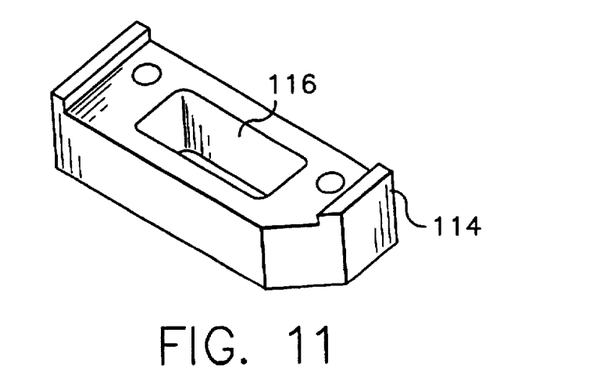
FIG. 11 is a perspective view of a contact support element.

Connected to one of end rails 52 is pin block 110 (see FIG. 10). Extending through pin block 110 are multiple electrical connector pins 112. Mounted to planar surface 96 by means of machine screws are four contact supports 114, each having a rectangular opening 116 therethrough (see FIG. 11). Mounted to each contact support 114 is a contact block 118 having a plurality of pin receptacles 120 therein. Wires (not shown) connect selected ones of pin receptacles 120 to cable plugs 108. Contact supports 114 are made from a nonconductive thermoplastic such as, for example, Delrin®. Contact blocks 118 are preferably made from a hard, dense thermosetting plastic such as Synthane®.

Figure 12:
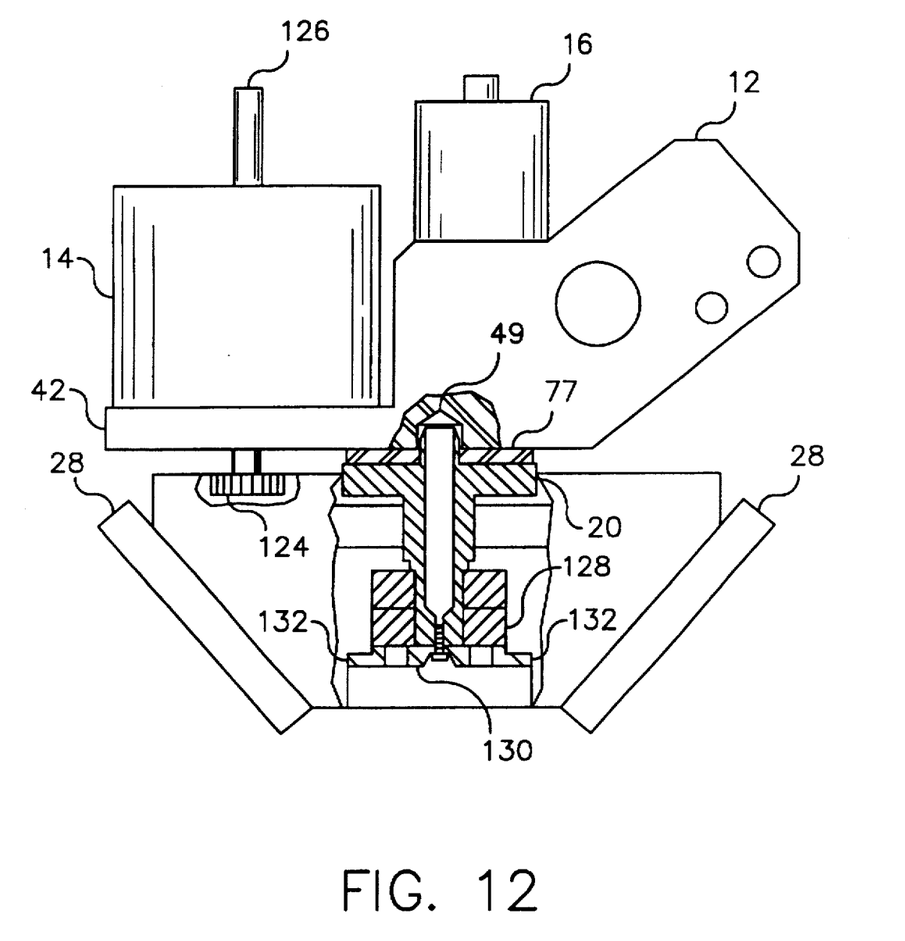
FIG. 12 is a side elevational/partial sectional view of the robotic turret tool of the present invention.

Mounted within upper rim portion 82 of turret head 22 is internal ring gear 122. (The gear teeth of ring gear 122 are not shown.) Internal ring gear 122 meshes with spur gear 124 mounted to the drive shaft 126 of stepper motor 114. In such manner, actuation of stepper motor 114 drives the rotation of turret head 22. Turret head 22 is mounted to turret shaft 120 by means of a duplex bearing 128 (see FIG. 12) which is press fit into bearing recess 92. There is an inner bearing retainer 130 which threadably engages threaded bore 78 of turret shaft 120. There is also an outer bearing retainer 132 which is connected to turret head 22 by means of machine screws.

Extending from internal ring gear 122 is locator pin 134. Mounted to the side of stepper motor support 42 is sensor mounting block 136. Extending from sensor mounting block 136 is a sensor (not shown) which is preferably an EM-type sensor which allows the turret mechanism 10 to determine the rotational position of turret head 112. Through rotating base 122 with stepper motor 14, the locator pin 124 will be moved past the sensor allowing the turret mechanism to fix the position of the turret head 22.

A different tool 26 may be mounted on each tool mounting surface 84. An electrical connection (not shown) is made by connecting each individual tool 25 to one of the cable plugs 108. In addition, one or two hoses (not shown) connect each individual tool 26 with one or two of the tapped holes 104.

On power up of the turret mechanism 10 of the present invention, the linear actuator 16 moves the slide gate 50 to a retracted or unlocked position such that chocks 54 no longer engage wedge blocks 98. The stepper motor 14 then drives the turret head 22 to the home position through the interaction of spur gear 124 with internal ring gear 122. The home position is defined by the locator pin 134 and the sensor mounted in sensor mounting block 136. The robot then signals which of the tools 26 mounted to turret head 22 is to be used and the stepper motor 14 rotates the turret head 22 to bring the desired tool 26 into the active position. The active position for a tool 26 is generally vertically aligned with the spindle of the robot, the spindle residing in the longitudinal bore 32 of pinch block 30. Once the desired tool 26 is in place, the linear actuator 16 drives locking element 18 downward to a locked position wherein the major chamfered surface 56 of each of the chocks 54 engages one of the inclined surfaces 100 of the wedge blocks 98. The minor chamfered surfaces 58 of chocks 54 do not contact any part of the wedge blocks 98 when locking element 18 resides in the locked position. The purpose of minor chamfered surfaces 58 is merely to aid in clearance tolerance as the locking element move from the unlocked position to the locked position, or vice versa. Thus, it should be appreciated that the chocks 54 can be designed without minor chamfered surfaces 56. The locking action of the major chamfered surfaces 56 with the inclined surfaces 100 removes any potential misalignment which may have been introduced by the stepper motor 16 thereby ensuring that the electrical pins 112 precisely engage the pin receptacles 120. There are wires (not shown) supplying electrical power and control to electrical pins 112. In such manner, when electrical pins 112 engage the pin receptacles 120 of the desired tool, the tool 26 is supplied with the necessary electrical power and control circuitry. Until that point, the tool 26 is not capable of being activated. Of course, a cable (not shown) connects each cable plug 108 with one of the tools 26. Since each contact block 118 is wired to a corresponding cable plug 108 on upper rim portion 82, engagement of electrical connector pins 112 with a selected one of the pin receptacles 120 activates only the selected tool 26. Jumpers within the pin receptacles 120 may be used to provide a unique signature for each lockup location thereby allowing another verification of stepper motor positioning.

When the linear actuator 26 has driven the chock 54 totally to reside in abutment with wedge blocks 98, bores 66 align with bores 102 which supply pneumatic pressure to the selected tool 26. Hoses (not shown) connect a pair of the tapped holes 104 to each of the tools 26. Pneumatic pressure or vacuum is supplied through hoses or tubes (not shown) connected to bores 64. O-Rings are provided in a recess in each of the major chamfered surfaces 56 to provide a seal. Thus, when the locking element 18 has been moved to a fully locked position, the tool 26 in the active position is connected both electrically and pneumatically.

The turret mechanism 10 of the present invention is designed to interface with industrial assembly robots such as, for example, the Adept 550 as manufactured by Adept Technology, Inc., of San Jose, Calif.

It should be appreciated by those skilled in the art that a single set of services (electric and pneumatic) supplied to the locking mechanism which then enables connections to the appropriate tool 26 as it is rotated into position. Consequently, it is not possible to index the turret head 22 or even disengage the slide gate 50 without first disconnecting the services to the active tool 26.

Although the preferred embodiment of the present invention is described herein as having four tool mounting surfaces 84, it should be understood that the turret head 22 can be designed to have two or more surfaces. However, it becomes impractical, particularly for small robots, to have more than six tool mounting surfaces. The number of wedge blocks 98 needed for any particular design is equal to the number of tool mounting surfaces 84.

The preferred embodiment has been described herein such that there are two upper pneumatic conduit paths and eight lower pneumatic conduit paths. In such manner, when locking element 18 is in the locked position, the two upper pneumatic conduit paths align with a pair of the lower pneumatic conduit paths (which are dedicated to a selected tool) thereby forming two completed conduit paths to the selected tool. Each of the completed conduit paths may be used to supply a vacuum, or air under positive pressure, or both to the selected tool. The terms "pneumatic conduit path" and "pneumatic supply conduit path" as used herein are intended to mean a path through which a vacuum may be drawn or through which a gas under a greater than atmospheric pressure is supplied.

It should be appreciated by those skilled in the art that the turret mechanism 10 of the present invention could easily be designed such that only a single completed pneumatic conduit path is created for the selected tool when the locking element 18 is moved to the locked position. In such an embodiment, there would only be one upper pneumatic conduit path through the locking element 18 and there would be a single lower pneumatic conduit path associated with each wedge block 98. Although, such a design would still be functional it would lose some of the versatility of the preferred embodiment.

From the foregoing, it will be seen that this invention is one well adapted to attain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A robotic turret tool device for use with an industrial robot having a spindle extending therefrom, said robotic turret tool device comprising:

(a) a mounting bracket adapted to be affixed to the spindle of the industrial robot, said mounting bracket including a locking element support;

(b) a turret shaft non-rotatably affixed to said mounting bracket;

(c) a turret head rotatably supported on said turret shaft, said turret head including at least two tool mounting surfaces and an upper, generally planar surface having at least two wedge blocks projecting therefrom, each of said at least two wedge blocks having two inclined surfaces;

(d) a first pneumatic conduit bore through each of said inclined surfaces and extending to an external surface of said turret head;

(e) a locking element slidably mounted in said locking element support, said locking element including a pair of spaced apart chocks, each of said chocks including a pair of chamfered surfaces, said locking element being movable from a locked position where said chamfered surfaces engage said inclined surfaces to an unlocked position where said chocks do not interfere with said wedge blocks;

(f) a second pneumatic conduit bore into one of said chamfered surfaces on each of said chocks and through said locking element, said second pneumatic conduit bores aligning with two of said first pneumatic conduit bores when said locking element is in said locked position; and (g) means for rotating said turret head, said means for rotating attached to said mounting bracket.

2. A robotic turret tool device as recited in claim 1 further comprising:

(a) a contact block for each of said tool mounting surfaces, each of said contact blocks mounted to said generally planar surface, each of said contact blocks having a plurality of pin receptacles therein; and (b) a pin block attached to said locking element, said pin block having a plurality of electrical connector pins extending therefrom, said electrical connector pins inserting into said pin receptacles when said locking element is moved to said locked position.

3. A robotic turret tool device for use with an industrial robot having a spindle extending therefrom, said robotic turret tool device comprising:

(a) a mounting bracket adapted to be affixed to the spindle of the industrial robot, said mounting bracket including a locking element support;

(b) a turret shaft affixed to said mounting bracket;

(c) a turret head rotatably supported on said turret shaft, said turret head including at least two tool mounting surfaces (d) a locking element slidably mounted in said locking element support, said locking element including an upper electrical supply connector and an upper pneumatic supply conduit path, said locking element being movable from a locked position engaging said turret head to an unlocked position away from said turret head;

(e) at least two lower electrical supply connectors mounted to said turret head, each of said lower electrical supply connectors being dedicated to one of said at least two tool mounting surfaces; and (f) at least two lower pneumatic supply conduit paths, each of said lower pneumatic supply conduit paths being dedicated to one of said at least two tool mounting surfaces, said upper pneumatic supply conduit path aligning with a selected one of at least two lower pneumatic supply conduit paths when said locking element is moved to said locked position, said upper electrical supply connector aligning with a selected one of at least two lower electrical supply connectors when said locking element is moved to said locked position.

4. A robotic turret tool device as recited in claim 3 further comprising:

means for rotating said turret head, said means for rotating attached to said mounting bracket.

5. A robotic turret tool device for use with an industrial robot, said robotic turret tool device comprising:

(a) a mounting bracket adapted to be affixed to the industrial robot, said mounting bracket including a locking element support;

(b) a turret shaft affixed to said mounting bracket;

(c) a turret head rotatably supported on said turret shaft, said turret head including at least two tool mounting surfaces;

(d) a locking element slidably mounted in said locking element support, said locking element including a upper electrical supply connector and an upper pneumatic supply conduit path;

(e) means for moving said locking element from a locked position engaging said turret head to an unlocked position away from said turret head;

(f) at least two lower electrical supply connectors mounted to said turret head, each of said lower electrical supply connectors being dedicated to one of said at least two tool mounting surfaces; and (g) at least two lower pneumatic supply conduit paths, each of said lower pneumatic supply conduit paths being dedicated to one of said at least two tool mounting surfaces, said upper pneumatic supply conduit path aligning with a selected one of at least two lower pneumatic supply conduit paths when said locking element is moved to said locked position, said upper electrical supply connector aligning with a selected one of at least two lower electrical supply connectors when said locking element is moved to said locked position.

6. A robotic turret tool device as recited in claim 5 further comprising:

means attached to said mounting bracket for rotating said turret head, said means for rotating attached to said mounting bracket.

7. A robotic turret tool device as recited in claim 6 further comprising:

a ring gear mounted in said turret head.

8. A robotic turret tool device as recited in claim 7 wherein:

said means attached to said mounting bracket for rotating said turret head is a stepper motor with a spur gear, said spur gear intermeshing with said ring gear.

9. A robotic turret tool device as recited in claim 5 further comprising:

sensor means attached to said mounting bracket for determining a rotational position of said turret head.

10. A robotic turret tool device as recited in claim 9 wherein:

said sensor means is an electromagnetic-type sensing device.

11. A robotic turret tool device as recited in claim 3 wherein said locking element comprises:

a pair of spaced end rails, each of said end rails including a pair of chamfered surfaces disposed on a distal end thereof, said upper pneumatic supply conduit path being into said end rails and terminating at one of said chamfered surfaces on each of said distal ends.

12. A robotic turret tool device as recited in claim 11 wherein said turret head includes:

a generally planar upper surface having at least two wedge blocks projecting therefrom, each of said at least two wedge blocks having two inclined surfaces, said chamfered surfaces engaging said inclined surfaces when said locking element is in said locked position, said at least two lower pneumatic supply conduit paths terminating at said inclined surfaces of said wedge blocks, said chamfered surfaces in combination with said inclined surfaces ensuring alignment of said upper pneumatic supply conduit path with a selected one of said at least two lower pneumatic supply conduit paths.

13. A robotic turret tool device as recited in claim 5 wherein said locking element comprises:

a pair of spaced end rails, each of said end rails including a pair of chamfered surfaces disposed on a distal end thereof, said upper pneumatic supply conduit path being into said end rails and terminating at one of said chamfered surfaces on each of said distal ends.

14. A robotic turret tool device as recited in claim 13 wherein said turret head includes:

a generally planar upper surface having at least two wedge blocks projecting therefrom, each of said at least two wedge blocks having two inclined surfaces, said chamfered surfaces engaging said inclined surfaces when said locking element is in said locked position, said at least two lower pneumatic supply conduit paths terminating at said inclined surfaces of said wedge blocks, said chamfered surfaces in combination with said inclined surfaces ensuring alignment of said upper pneumatic supply conduit path with a selected one of said at least two lower pneumatic supply conduit paths.

15. A robotic turret tool device as recited in claim 5 wherein:

said mounting bracket includes a longitudinal bore adapted to receive a spindle extending from the industrial robot, said longitudinal bore having a longitudinal axis which is at an angle of about 40° from a cylindrical axis of said turret shaft.

16. A robotic turret tool device as recited in claim 3 wherein:

said mounting bracket includes a longitudinal bore adapted to receive a spindle extending from the industrial robot, said longitudinal bore having a longitudinal axis which is at an angle of about 40° from a cylindrical axis of said turret shaft.

17. A robotic turret tool device as recited in claim 5 wherein:

there are two lower pneumatic supply conduit paths dedicated to each of said tool mounting surfaces and there are two upper pneumatic supply conduit paths through said locking element.

18. A robotic turret tool device for use with an industrial robot having a spindle extending therefrom, said robotic turret tool device comprising:

(a) a mounting bracket adapted to be affixed to the industrial robot;

(b) a locking element slidably mounted on said mounting bracket, said locking element including an upper electrical supply circuit and an upper pneumatic supply circuit;

(c) a turret head rotatably supported on a turret shaft, said turret head including at least two tool mounting surfaces, said turret head also including a lower electrical supply circuit and a lower pneumatic supply circuit for each of said tool mounting surfaces, said turret shaft supported from said mounting bracket;

(d) means attached to said mounting bracket for rotating said turret head to move a selected tool mounted to one of said at least two tool mounting surfaces to an operating position; and (e) means for moving said locking element from a locked position engaging said turret head to an unlocked position away from said turret head, said upper electrical supply circuit and said upper pneumatic supply circuit connecting with said lower electrical supply circuit and said lower pneumatic supply circuit, respectively, associated with said tool in said operating position.

* * * * *